(12) United States Patent
Sethi

(10) Patent No.: US 12,204,421 B2
(45) Date of Patent: Jan. 21, 2025

(54) SYSTEM AND METHOD FOR LOGICAL DEVICE MIGRATION BASED ON A DOWNTIME PREDICTION MODEL

(71) Applicant: Dell Products L.P., Round Rock, TX (US)

(72) Inventor: Parminder Singh Sethi, Punjab (IN)

(73) Assignee: Dell Products L.P., Round Rock, TX (US)

( * ) Notice: Subject to any disclaimer, the term of this patent is extended or adjusted under 35 U.S.C. 154(b) by 192 days.

(21) Appl. No.: 18/156,308

(22) Filed: Jan. 18, 2023

(65) Prior Publication Data
US 2024/0241803 A1 Jul. 18, 2024

(51) Int. Cl.
G06F 11/16 (2006.01)
G06F 11/07 (2006.01)
G06F 11/34 (2006.01)

(52) U.S. Cl.
CPC ...... G06F 11/1658 (2013.01); G06F 11/0757 (2013.01); G06F 11/3419 (2013.01)

(58) Field of Classification Search
CPC ............. G06F 11/1658; G06F 11/0757; G06F 11/3419
See application file for complete search history.

(56) References Cited

U.S. PATENT DOCUMENTS

| | | | |
|---|---|---|---|
| 10,048,996 B1* | 8/2018 | Bell | G06F 11/3006 |
| 2016/0154690 A1* | 6/2016 | Horrell | G06F 11/26 714/57 |
| 2018/0143880 A1* | 5/2018 | Dornemann | G06F 11/2048 |
| 2019/0332496 A1* | 10/2019 | Chopra | G06F 11/1461 |
| 2020/0019465 A1* | 1/2020 | Khan | G06F 16/188 |
| 2022/0108167 A1* | 4/2022 | Upadhyay | G06F 3/061 |
| 2024/0028387 A1* | 1/2024 | Sethi | G06F 9/4856 |

FOREIGN PATENT DOCUMENTS

| | | | | |
|---|---|---|---|---|
| WO | WO-2006002071 A2 * | 1/2006 | | G06F 11/0709 |
| WO | WO-2023174550 A1 * | 9/2023 | | |

OTHER PUBLICATIONS

Ganguly et al., "A Practical Approach to Hard Disk Failure Prediction in Cloud Platforms: Big Data Model for Failure Management in Datacenters," 2016 IEEE Second International Conference on Big Data Computing Service and Applications, Oxford, UK, 2016, pp. 105-116 (Year: 2016).*

* cited by examiner

*Primary Examiner* — Kamini B Patel
*Assistant Examiner* — Indranil Chowdhury
(74) *Attorney, Agent, or Firm* — Chamberlain, Hrdlicka, White, Williams & Aughtry; Aly Dossa

(57) ABSTRACT

A method for managing a production environment includes obtaining telemetry information for a set of logical devices in the production environment, in response to the obtaining, perform a preprocessing of the telemetry information to obtain pre-processed data, perform a condition analysis on the pre-processed data to obtain a set of condition indicators, generating a downtime prediction model using the set of condition indicators and the telemetry information, and based on the downtime prediction model, initiating generation of a replacement logical device.

20 Claims, 5 Drawing Sheets ness SYSTEM AND METHOD FOR LOGICAL
DEVICE MIGRATION BASED ON A
DOWNTIME PREDICTION MODEL

BACKGROUND

Computing devices in a system may include any number of hardware resources such as processors, memory, and persistent storage. The computing devices may utilize the hardware resources to host any number of application containers or virtual machines. The use of the hardware resources may impose a scarcity of resources on the computing devices. The introduction of additional application containers or virtual machines to the computing devices may exacerbate such scarcity.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to methods and systems for predicting downtime (e.g., a time period before imminent failure) and using the predicted downtime for the migration of data in the logical devices. Embodiments disclosed herein include a predictive maintenance algorithm that includes acquiring data associated with the usage of the logical devices, preprocessing the data to obtain preprocessed data. The preprocessed data may be used to identify condition indicators to be used to determine whether a downtime is predicted to occur. A machine learning algorithm may be used to train a model using the condition factors. The machine learning model may be implemented to determine a proactive action for migrating the data in a logical device. For example, if a prediction is made, using the trained model, to determine that a logical device is nearing a predicted failure, embodiments disclosed herein may initiate a migration of data and/or metadata in the logical device to a replication logical device and scheduling the migration of the operation from the original, predicted failing logical device to the replication logical device.

Various embodiments of the invention are disclosed herein.

Figure 1:
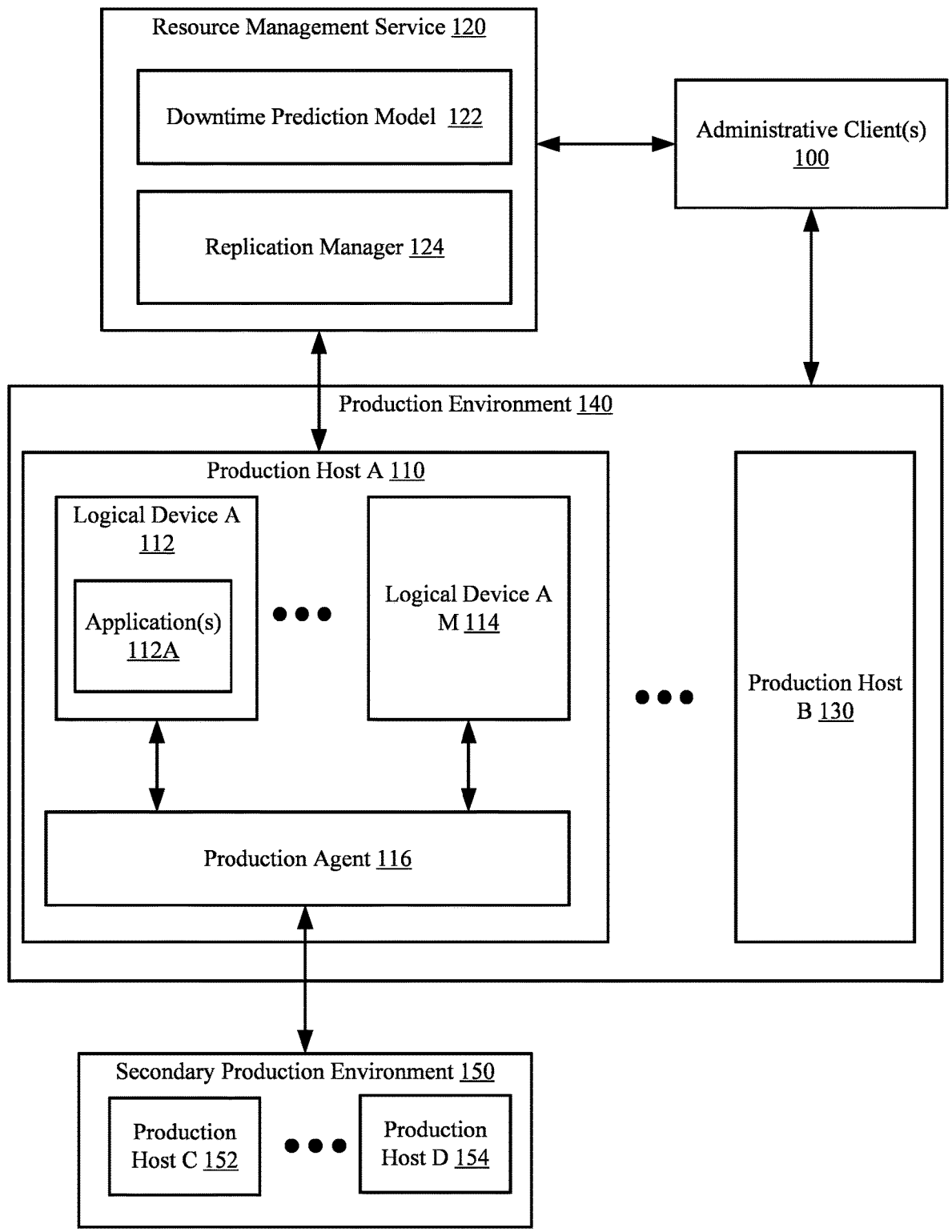
FIG. 1 shows a diagram of a system in accordance with one or more embodiments of the invention.

FIG. 1 shows an example system in accordance with one or more embodiments of the invention. The system includes a production environment (140), which includes any number of production hosts (110, 130), a secondary production environment (150), a resource management service (120), and any number of administrative clients (100). The system may include additional, fewer, and/or different components without departing from the invention. Each component may be operably connected to any of the other components via any combination of wired and/or wireless connections. Each component illustrated in FIG. 1 is discussed below.

In one or more embodiments of the invention, the production environment (140) includes production hosts (110, 130). Each production host (110, 130) may host one or more logical devices (112, 114). The logical devices (112, 114) may be entities that are virtualized to the hardware components in the production host (112, 114). Examples of logical devices (112, 114) include, but are not limited to, virtual machines and application containers. An application container may be a logical device that is virtualized, e.g., on an operating system (OS) level of the production hosts (110, 130) using computing resources (not shown) of the production hosts). The application containers may be stateless (e.g., does not store information regarding its own state). The virtual machines (VMs) may operate each using their own operating system, each managed using a hypervisor (not shown) that serves as an intermediate layer between the operating system of the virtual machines and the hardware resources. Each of the logical devices (112, 114) may be executed independently from other logical devices (112, 114) in the production host (110, 130). The logical devices (112, 114) may each host applications (112A). Each of the applications (112A) may be performing similar or different processes. In one or more embodiments of the invention, the applications (112A) provide services to users, e.g., clients (not shown). For example, the applications (112A) may host components. The components may be, for example, instances of databases, email servers, operating systems, and/or other components. The applications (112A) may host other types of components without departing from the invention. An application (112A) may be executed on one or more logical devices (112, 114) as instances of the application.

In one or more embodiments, the logical devices (112, 114) in the production environment (140) are grouped into workload clusters. The workload clusters may be a system of processes performed to service a goal of an entity (e.g., a corporate entity). The goal may be, for example, a business related workload. The business related workload may include servicing customers of the corporate entity. The workload cluster may be expected, at least by the entity, to operate within service level objectives (SLOs). In one or more embodiments, the workload cluster relies on dependencies between applications across logical devices. For example, a first application may service the workload of a workload cluster using data generated by a second application. The second application may operate in a second logical device different from the first application.

In one or more embodiments of the invention, the logical devices (112, 114) are implemented as computer instructions, e.g., computer code, stored on a persistent storage that when executed by a processor(s) of a computing device cause the computing device to provide the functionality of the logical devices (112, 114) described throughout this application.

In one or more embodiments of the invention, the production agent (118) includes functionality for obtaining information associated with the logical devices (112, 114). The production agent (118) may include functionality for obtaining telemetry information from the logical devices (112, 114) that are associated with the operability (e.g., resource consumption) of the logical devices (112, 114). The monitoring may be performed in accordance with FIGS. 2A-2B.

In one or more embodiments of the invention, the production agent (118) is implemented as computer instructions, e.g., computer code, stored on a persistent storage that when executed by a processor(s) of a computing device cause the computing device to provide the functionality of the production agent (118) described throughout this application.

In one or more embodiments, one or more of the logical devices (112, 114) are bound to a failure after a period of time. It may be beneficial for the production environment (140) and for the users utilizing the services of the logical devices to determine such period of time for each logical device. Further, it may be beneficial to remediate the failure preemptively. The remediation may include offering a replacement logical device that may be synchronized with the original logical device so that the replacement logical device may be scheduled to replace the original logical device.

To manage the remediation of the failure, the resource management service (120) includes functionality, the resource management service (120) includes functionality for obtaining information from the production agent (118) to generate a downtime prediction model that relates to calculating the time before failure of the logical devices (112, 114) from the production environment (140). The resource management service (120) may generate the downtime prediction model in accordance with FIG. 2A. To perform the aforementioned functionality, the resource management service (120) includes the downtime prediction model (122) and a replication manager (124). The resource management service (120) may include additional, fewer, and/or different components without departing from the invention.

In one or more embodiments, the downtime prediction model (122) is a data structure that takes as an input one or more condition indicators associated with a logical device and produces a predicted time before failure. In one or more embodiments of the invention, a condition indicator refers to an occurrence in a logical device that may cause the logical device to fail at some point in time in the future. Examples of condition indicators include, but are not limited to: an age of the logical device, an average resource consumption of the logical device, an age of the production host on which the logical device operates, and a network latency between the logical device and the administrative clients (100). Other condition indicators may be used as an input to the downtime prediction model (122) without departing from the invention.

In one or more embodiments, the replication manager (124) includes functionality for initiating a metadata transfer of any of the logical devices (112, 114). In one or more embodiments, the metadata transfer is performed in accordance with FIG. 2B. The replication manager (124) may further include functionality for changing the settings of the logical devices (112, 114) such that a replacement logical device may replace the operation of an original logical device (112, 114). In one or more embodiments, the replication manager (124) may set the original logical device to a suspended state after the metadata transfer is complete. At the same time, or at a substantially similar time, the replication manager (124) may set the replacement logical device to an active state. In this manner, the replacement logical device may replace the operation of the original logical device.

In one or more embodiments of the invention, the original logical device may operate in a production host (110, 130) of the production environment (140) or in a production host (152, 154) of the secondary production environment (150). Similarly, the replacement logical device may operate in a production host (110, 130) of the production environment (140) or in a production host (152, 154) of the secondary production environment (150). The production host (110, 130, 152, 154) of the original logical device may be similar or different from the production host (110, 130, 152, 154) of the replacement logical device.

Figure 4:
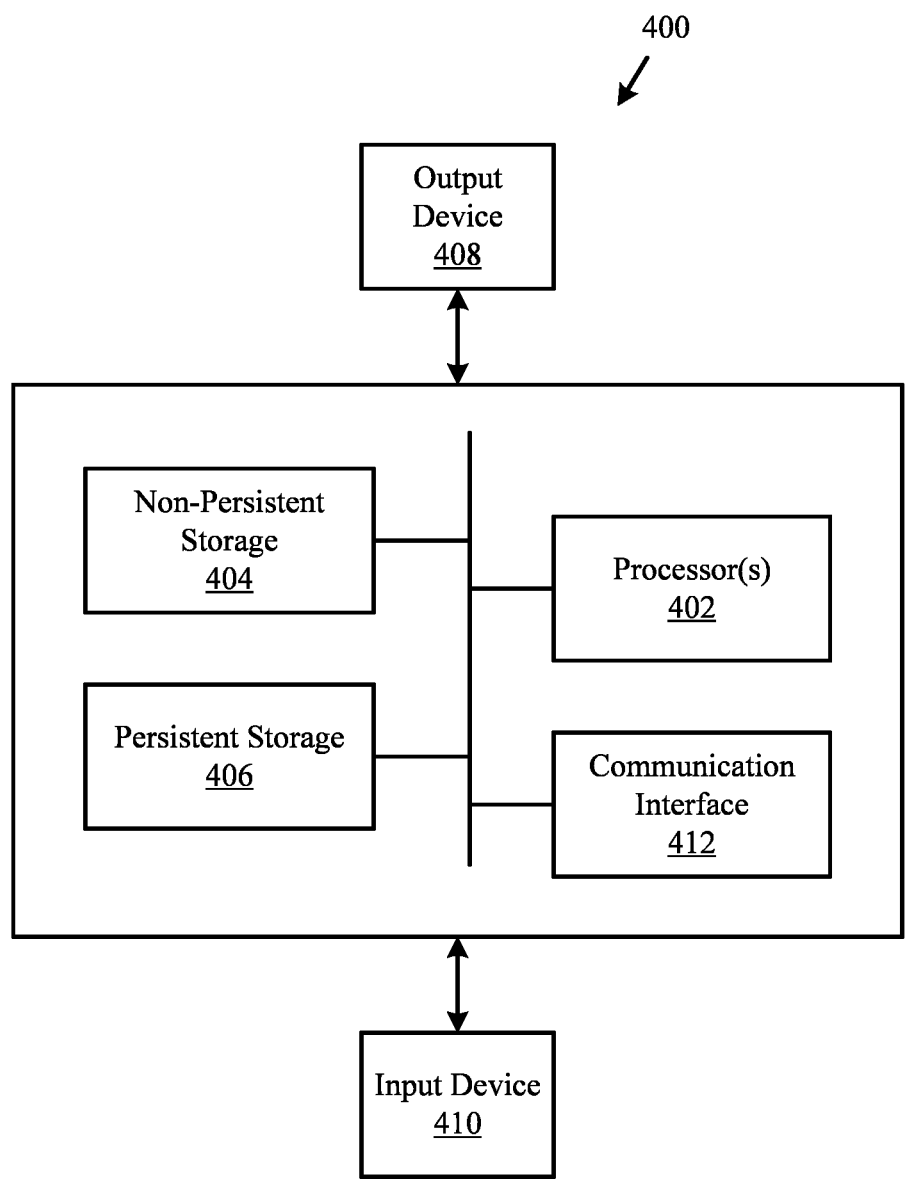
FIG. 4 shows a second example in accordance with one or more embodiments of the invention.

In one or more embodiments of the invention, the resource management service (120) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the resource management service (120) described throughout this application and/or all, or a portion thereof, of the methods illustrated in FIGS. 2A-2B.

In one or more embodiments of the invention, the resource management service (120) is implemented as a logical device. The logical device may utilize the computing resources of any number of computing devices and thereby provide the functionality of the resource management service (120) described throughout this application and/or all, or a portion thereof, of the methods illustrated in FIGS. 2A-2B.

In one or more embodiments of the invention, the production hosts (110, 130) are implemented as computing devices (see e.g., FIG. 4). The computing devices may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production hosts (110, 130) described throughout this application and/or all, or a portion thereof, of the methods illustrated in FIG. 2.

In one or more embodiments of the invention, the production hosts (110, 130) are each implemented as a logical device. The logical device may utilize the computing resources of any number of computing devices and thereby provide the functionality of the production hosts (110, 130) described throughout this application and/or all, or a portion thereof, of the methods illustrated in FIG. 2.

While the system of FIG. 1 illustrates a production environment (140), the system may include additional production environments without departing from the invention.

Figure 2A:
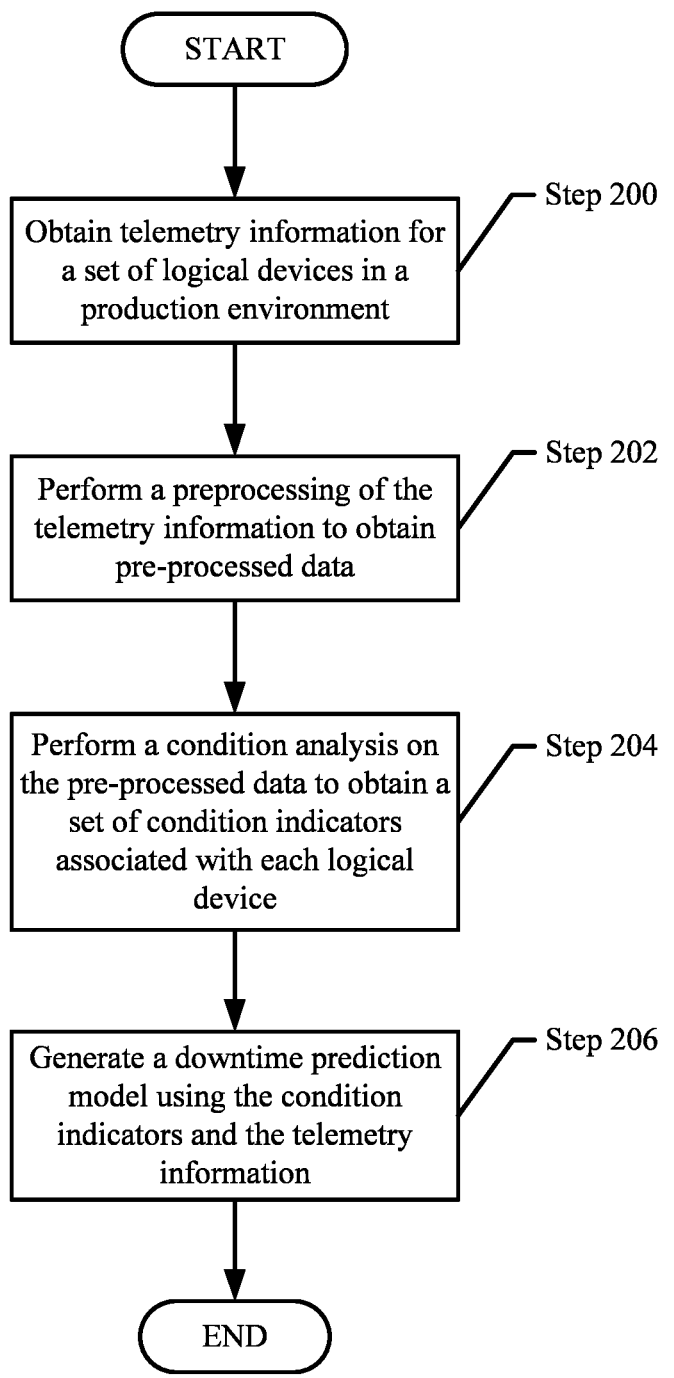
FIG. 2A shows a flowchart for generating a downside prediction model in accordance with one or more embodiments of the invention.
Figure 2B:
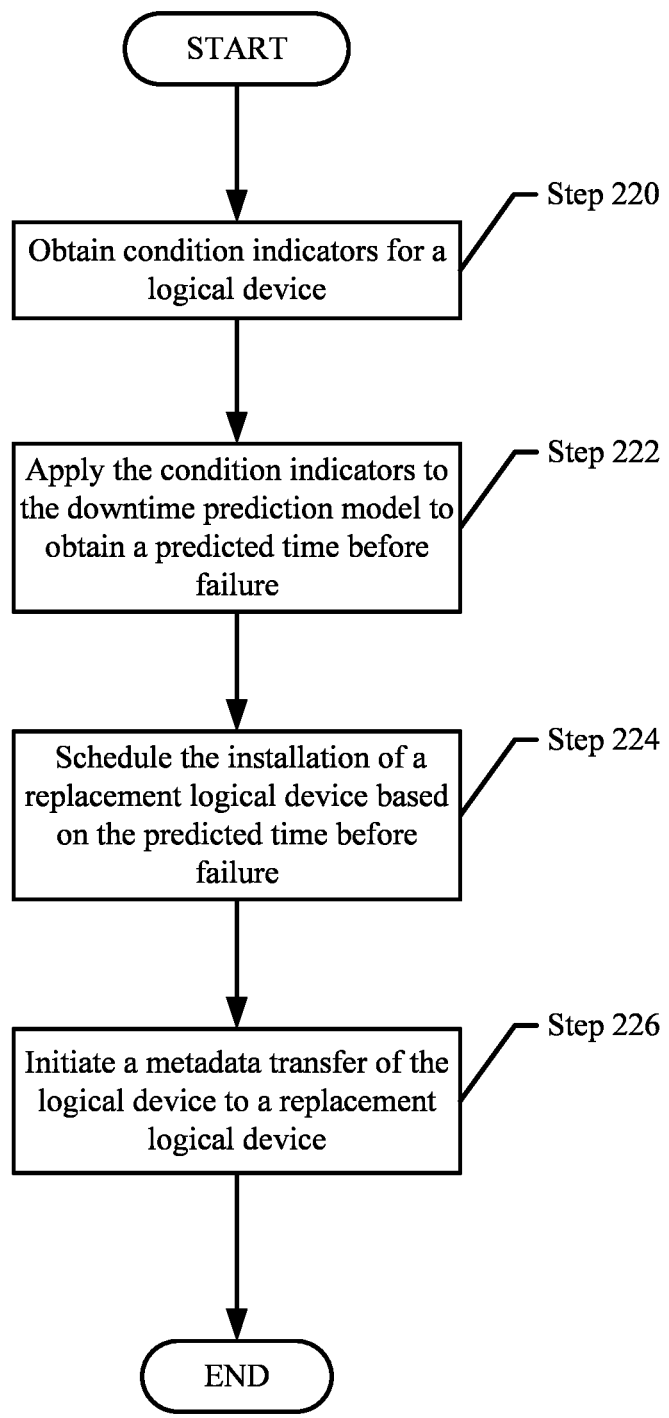
FIG. 2B shows a flowchart for initiating a replacement of a logical device in accordance with one or more embodiments of the invention.

FIGS. 2A-2B show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2B may be performed in parallel with any other steps shown in FIGS. 2A-2B without departing from the scope of the invention.

FIG. 2A shows a flowchart for generating a downside prediction model in accordance with one or more embodiments of the invention. The method shown in FIG. 2A may be performed by, for example, a resource management service (120, FIG. 1). Other components of the system illustrated in FIG. 1 may perform the method of FIG. 2A without departing from the invention.

Turning to FIG. 2A, in step 200, telemetry information is obtained for a set of logical devices in a production environment. In one or more embodiments of the invention, the telemetry information is information obtained during the monitoring of the set of logical devices. The telemetry information may include, for example, an application identifier for each application in the set of logical devices, a runtime of each of the set of logical devices, and a number of failures of each of the logical devices.

In step 202, a preprocessing is performed on the telemetry information to obtain pre-processed data. In one or more embodiments of the invention, the preprocessing includes filtering the telemetry information to specify information deemed relevant to the generation of the downtime prediction model. For example, the number of failures of a logical device may be relevant for the prediction of future times until failures of other logical devices. As such, the number of failures of a logical device may be included in the pre-processed data. Other information may be included in the pre-processed data without departing from the invention.

In step 204, a condition analysis is performed on the pre-processed data to obtain a set of condition indicators associated with each logical device. In one or more embodiments, the condition analysis is an analysis for determining parameters that may have caused the logical devices to fail. Examples of the set of condition indicators include, but are not limited to: an age of the logical device, an average resource usage of the logical device, an age of the production host on which the logical device operates, and a network latency between the logical device and the clients that utilize the logical device.

In step 206, a downtime prediction model is generated using the set of condition indicators and the telemetry information. In one or more embodiments, the downtime prediction model is generated by applying a machine learning algorithm on the set of condition indicators and at least a portion of the telemetry information. For example, the machine learning algorithm may analyze the failures of the logical devices (e.g., as specified in the telemetry information), the timestamp of such failures as specified in the telemetry information, the set of condition indicators, and the timestamps of the condition indicators to generate the downtime prediction model, which inputs a condition indicator and outputs a predicted time before failure. In one example, the predicted time before failure is a point in time in which the logical device is expected to fail. In another example, the predicted time before failure is a period of time within which the logical device is predicted to fail. In the second example, the length of the period of time may be based on the amount of condition indicators or based on the type of condition indicators. Specifically, if more condition indicators are input into the downtime prediction model, then a shorter (e.g., more precise) period of time may be output.

FIG. 2B shows a flowchart for initiating a replacement of a logical device in accordance with one or more embodiments of the invention. The method shown in FIG. 2B may be performed by, for example, a resource management service (120, FIG. 1). Other components of the system illustrated in FIG. 1 may perform the method of FIG. 2B without departing from the invention.

In step 220, condition indicators for a logical device are obtained. In one or more embodiments, the condition indicators may be obtained from and administrator managing the production environment and requesting to predict at time to failure for the logical device. The logical device may or may not be one of the logical devices monitored in the method of FIG. 2A without departing from the invention.

In step 222, the condition indicators are applied to the downtime prediction model to obtain a predicted time before failure. As discussed above, the downtime prediction model may input a set of condition indicators to output a prediction before failure. In one example, the predicted time before failure is a point in time in which the logical device is expected to fail. In another example, the predicted time before failure is a period of time within which the logical device is predicted to fail.

In step 224, the installation of a replacement logical device is scheduled based on the predicted time before failure. In one or more embodiments of the invention, the installation of the replacement logical device is scheduled by generating the replacement logical device, calculating a time required for a metadata transfer (e.g., copying the data and/or metadata in the original logical device to the replacement logical device), and determining a point in time to start the metadata transfer. The time required may be based on the amount of data to be transferred to the replacement logical device and the network bandwidth of the production hosts hosting the original logical device and the replacement logical device. Based on the calculated time required, a buffer window may be determined. The buffer window may be a period of time between the predicted point in time in which the logical device may fail and a point in time of the expected completion of the metadata transfer. The buffer window may reduce the risk of attempting to complete the metadata transfer after the logical device has failed. In one or more embodiments the point in time to start the metadata transfer may be determined based on the buffer window (which may be a parameter defined by an administrator of the production environment) and the time required for the metadata transfer. For example, the metadata transfer may be scheduled to begin such that the expected time to complete is before the buffer window begins.

In one or more embodiments, the scheduling of the replacement further includes setting the original logical device in a suspended state (e.g., to not process any data) and setting the replacement logical device in an active state (e.g., to replace the processing of the original logical device). The changing of the settings for the original and replacement logical devices may be performed after completion of the metadata transfer and before the predicted time to failure (e.g., during the buffer window).

In step 226, a metadata transfer of the logical device to the replacement logical device is initiated. In one or more embodiments, the metadata transfer includes copying the data generated by, used by, and/or otherwise associated with the original logical device and installing the copy to the replacement logical device.

Further, the replacement logical device may be synchronized with the original logical device after the metadata transfer is complete. The synchronization may include copying data generated by the original logical device after the metadata transfer is complete.

EXAMPLE

Figure 3:
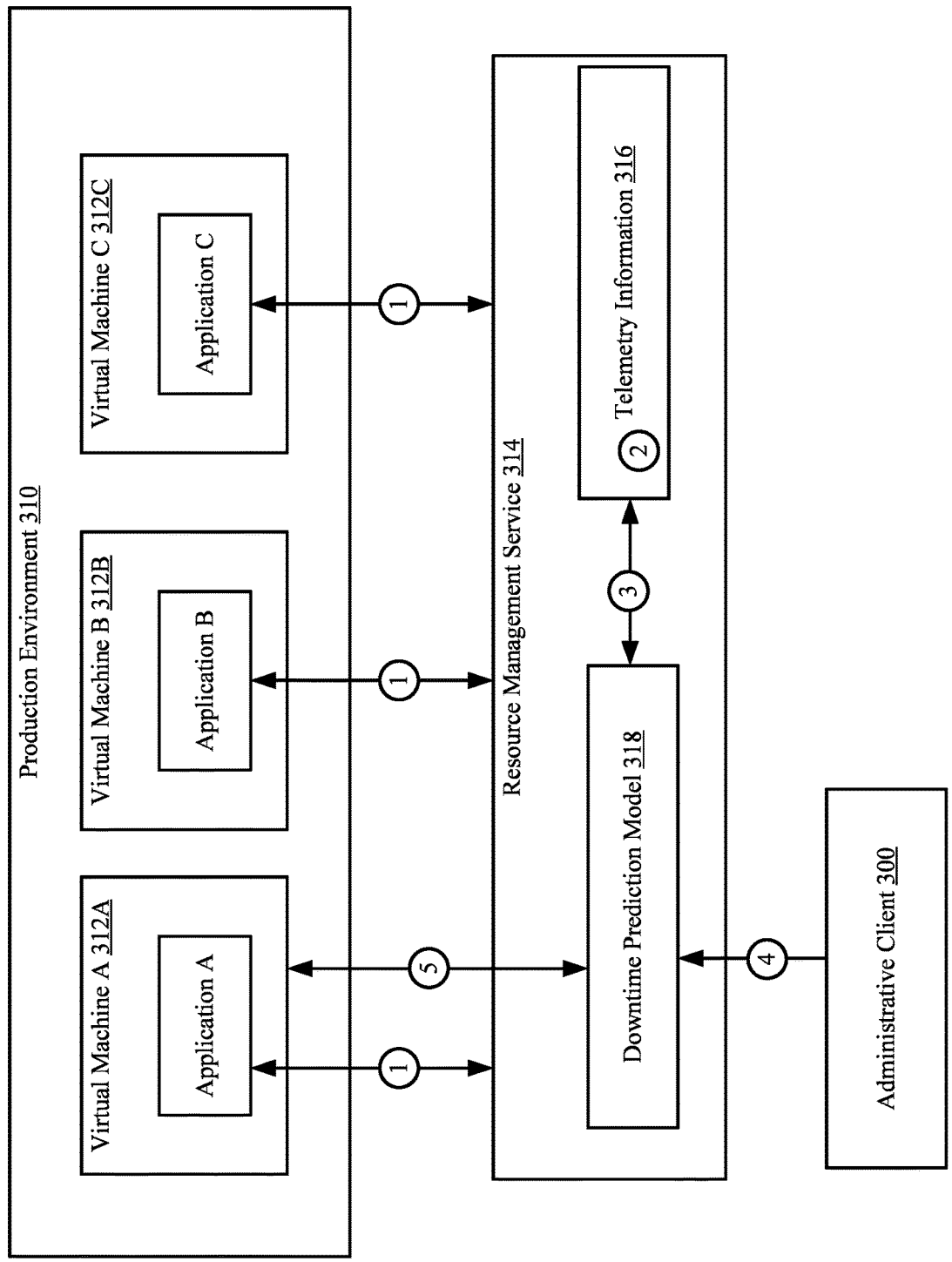
FIG. 3 shows an example in accordance with one or more embodiments of the invention.

The following section describes an example. The example, illustrated in FIG. 3, is not intended to limit the invention and is independent from any other examples discussed in this application. Turning to the example, consider a scenario in which an upgrade estimation time is performed for an application executing on two client devices.

Turning to the example, FIG. 3 shows a diagram of an example system. For the sake of brevity, not all components of the example system may be illustrated in FIG. 3. The example system includes a production environment (310), a resource management service (314), and an administrative client (300).

At a first point in time, the resource management service (314) monitors three virtual machines (312A, 312B, 312C) in the production environment (310) [1]. The resource management service (314) monitors the activity of the applications in the virtual machines (312A, 312B, 312C) to track resource usage. Further, each failure is tracked and stored in the telemetry information (316) [2]. The telemetry information (316) is used in accordance with FIG. 3A to generate a downtime prediction model (318) [3]. The downtime prediction model (318) outputs a predicted time to failure for a condition indicator that is inputted.

At a later point in time, the administrative client (300) sends a condition indicator relating to VM A (312A). The condition indicator is an age that is greater than four months. The condition indicator is input to the downtime prediction model [4]. The output is a predicted time before failure that specifies a time period between 20 days and 25 days from this point in time.

Based on the predicted period of time, a metadata transfer is scheduled. Specifically, the resource management service (314) calculates a required time for completing the copying and transfer of data of VM A (312A) by identifying the amount of data to be copied using the telemetry information (316) and calculating the time required using the size of the data. The time required is calculated to be 30 minutes. Based on this, the metadata transfer is scheduled for 19 days from now. In this manner, a buffer window of one day is provided.

Following the scheduling of the metadata transfer, the metadata transfer is performed in at the scheduled point in time to a replacement VM (not shown). Further, after the metadata transfer is completed, the replacement VM continues to be synchronized with VM A (312A). During the buffer window after the metadata transfer is completed, the operation of VM A (312A) is transferred to the replacement VM. In this manner, the transfer of operation of application A in VM A (312A) to the replacement VM is seamless.

END OF EXAMPLE

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same as or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the use of computing devices that reduce the anxiety of users in a client environment that causes application abstention. The anxiety may be reduced by providing the users with information that may encourage the users to install application upgrades. The information may be generated by monitoring the clients to identify the device configuration information and/or any client initial intent information corresponding to the reasons provided by the client device.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing a production environment, comprising:
   obtaining telemetry information for a set of logical devices in the production environment;
   in response to the obtaining;
      performing a preprocessing of the telemetry information to obtain pre-processed data;
      performing a condition analysis on the pre-processed data to obtain a set of condition indicators;
      generating a downtime prediction model using the set of condition indicators and the telemetry information; and
      based on the downtime prediction model, initiating generation of a replacement logical device.

2. The method of claim 1, wherein initiating the generation of the replacement logical device comprises:
   obtaining a second set of condition indicators for a logical device;
   in response to the second set of condition indicators:
      applying the second set of condition indicators to the downtime prediction model to obtain a predicted time before failure of the logical device;
      scheduling, based on the predicted time, the generation of the replacement logical device, wherein the replacement logical device is a digital twin of the logical device;
      based on the scheduling:
         generating the replacement logical device;
         initiating, after the generating, a metadata transfer of metadata associated with the logical device to the replacement logical device, wherein the replacement logical device becomes an active logical device when the logical device fails.

3. The method of claim 2, wherein the logical device is executing on a production environment, and wherein the replacement logical device is executing on a second production environment.

4. The method of claim 1, wherein the telemetry information comprises: an application identifier of each application of the set of logical devices, a runtime of each application of the set of logical devices, and a number of failures of each of the set of logical devices.

5. The method of claim 1, wherein the pre-processed data comprises: a timestamp for a failure of each of the set of logical devices, a health status of each of the set of logical devices, a production host in which each of the set of logical devices is hosted, and an amount of data hosted by each of the set of logical devices.

6. The method of claim 1, wherein generating the downtime prediction model comprises:
   applying a machine learning algorithm to the set of condition indicators and to the telemetry information to generate the downtime prediction model.

7. The method of claim 1, wherein the replacement logical device is a virtual machine.

8. The method of claim 1, wherein the replacement logical device is an application container.

9. The method of claim 8, wherein the application container is stateless.

10. The method of claim 1, wherein the replacement logical device is one of the set of logical devices.

11. A non-transitory computer readable medium comprising computer readable program code, which when executed by a computer processor enables the computer processor to perform a method for managing a production environment, the method comprising:
    obtaining telemetry information for a set of logical devices in the production environment;
    in response to the obtaining;
       performing a preprocessing of the telemetry information to obtain pre-processed data;
       performing a condition analysis on the pre-processed data to obtain a set of condition indicators;
       generating a downtime prediction model using the set of condition indicators and the telemetry information; and
       based on the downtime prediction model, initiating generation of a replacement logical device.

12. The non-transitory computer readable medium of claim 11, wherein initiating the generation of the replacement logical device comprises:
    obtaining a second set of condition indicators for a logical device;
    in response to the second set of condition indicators:
       applying the second set of condition indicators to the downtime prediction model to obtain a predicted time before failure of the logical device;
       scheduling, based on the predicted time, the generation of the replacement logical device, wherein the replacement logical device is a digital twin of the logical device;
       based on the scheduling:
          generating the replacement logical device;
          initiating, after the generating, a metadata transfer of metadata associated with the logical device to the replacement logical device, wherein the replacement logical device becomes an active logical device when the logical device fails.

13. The non-transitory computer readable medium of claim 12, wherein the logical device is executing on a production environment, and wherein the replacement logical device is executing on a second production environment.

14. The non-transitory computer readable medium of claim 11, wherein the telemetry information comprises: an application identifier of each application of the set of logical devices, a runtime of each application of the set of logical devices, and a number of failures of each of the set of logical devices.

15. The non-transitory computer readable medium of claim 11, wherein the pre-processed data comprises: a timestamp for a failure of each of the set of logical devices, a health status of each of the set of logical devices, a production host in which each of the set of logical devices is hosted, and an amount of data hosted by each of the set of logical devices.

16. The non-transitory computer readable medium of claim 11, wherein generating the downtime prediction model comprises:
    applying a machine learning algorithm to the set of condition indicators and to the telemetry information to generate the downtime prediction model.

17. A system, comprising:
    a processor; and
    memory comprising instructions, which when executed by the processor, performs a method comprising:

obtaining telemetry information for a set of logical devices in a production environment;

in response to the obtaining:

performing a preprocessing of the telemetry information to obtain pre-processed data;

performing a condition analysis on the pre-processed data to obtain a set of condition indicators;

generating a downtime prediction model using the set of condition indicators and the telemetry information; and based on the downtime prediction model, initiating generation of a replacement logical device.

18. The system of claim 17, wherein initiating the generation of the replacement logical device comprises:

obtaining a second set of condition indicators for a logical device;

in response to the second set of condition indicators:

applying the second set of condition indicators to the downtime prediction model to obtain a predicted time before failure of the logical device;

scheduling, based on the predicted time, the generation of the replacement logical device, wherein the replacement logical device is a digital twin of the logical device;

based on the scheduling:

generating the replacement logical device;

initiating, after the generating, a metadata transfer of metadata associated with the logical device to the replacement logical device, wherein the replacement logical device becomes an active logical device when the logical device fails.

19. The system of claim 17, wherein the pre-processed data comprises: a timestamp for a failure of each of the set of logical devices, a health status of each of the set of logical devices, a production host in which each of the set of logical devices is hosted, and an amount of data hosted by each of the set of logical devices.

20. The system of claim 17, wherein generating the downtime prediction model comprises:

applying a machine learning algorithm to the set of condition indicators and to the telemetry information to generate the downtime prediction model.

* * * * *